United States Patent
Bougelot et al.

(10) Patent No.: US 7,241,827 B2
(45) Date of Patent: Jul. 10, 2007

(54) MINERAL COMPOUNDS, METHOD FOR PREPARING SAME AND USE THEREOF IN THERMOPLASTICS MATERIALS

(75) Inventors: Emmanuelle Bougelot, Montgeron (FR); Dominique Dupuis, Crépy-en-Valois (FR); Gilles Robert, Irigny (FR); Joël Varlet, Dardilly (FR)

(73) Assignee: Rhodianyl, Boulogne-Billancourt (FR)

( * ) Notice: Subject to any disclaimer, the term of this patent is extended or adjusted under 35 U.S.C. 154(b) by 301 days.

(21) Appl. No.: 10/362,586

(22) PCT Filed: Aug. 23, 2001

(86) PCT No.: PCT/FR01/02653

§ 371 (c)(1),
(2), (4) Date: Sep. 29, 2003

(87) PCT Pub. No.: WO02/16264

PCT Pub. Date: Feb. 28, 2002

(65) Prior Publication Data

US 2004/0033186 A1  Feb. 19, 2004

(30) Foreign Application Priority Data

Aug. 23, 2000  (FR) .................................. 00 10872

(51) Int. Cl.
*C08K 3/32* (2006.01)
*C08K 3/10* (2006.01)
*C08K 5/51* (2006.01)
(52) U.S. Cl. ........................ 524/414; 524/127; 524/413
(58) Field of Classification Search ................ 524/127, 524/413–414; 556/28, 56; 423/584, 586
See application file for complete search history.

(56) References Cited

U.S. PATENT DOCUMENTS

| | | | | |
|---|---|---|---|---|
| 4,507,437 A | * | 3/1985 | Kato et al. | 525/106 |
| 4,826,663 A | | 5/1989 | Alberti et al. | |
| 5,266,298 A | * | 11/1993 | Manganaro et al. | 423/584 |
| 5,482,544 A | * | 1/1996 | Okuda et al. | 106/14.12 |
| 5,656,709 A | * | 8/1997 | Fukushima et al. | 528/9 |

FOREIGN PATENT DOCUMENTS

GB  1 282 594  7/1972

OTHER PUBLICATIONS

Patent Abstracts of Japan, vol. 008, No. 150, Jul. 12, 1984, & JP 59 054612.
Patent Abstracts of Japan, vol. 018, No. 114, Feb. 24, 1994 & JP 05 306370.
Patent Abstracts of Japan, vol. 010, No. 107, Apr. 22, 1986 & JP 60 239313.
Patent Abstracts of Japan, vol. 1997, No. 07, Jul. 31, 1997 & JP 09 078430.
Kijima et al., "Carbon number-dependent intercalation and interlayer amidation properties of α, w-alkanediamines for α-titanium (2-carboxyethyl)phosphonate phosphate", *J. Chem. Soc. Dalton Trans.*, 1998, pp. 1633-1637.
Casciola et al., "Intercalation of α, w-Alkyldiamines in Layered α-Zirconium Phosphate and the Inclusion Behaviour of Some of the Intercalates Obtained", *Journal of Inclusion Phenomena* 6 (1988), pp. 291-306.

* cited by examiner

*Primary Examiner*—Peter Szekely
(74) *Attorney, Agent, or Firm*—Buchanan, Ingersoll & Rooney, PC

(57) ABSTRACT

The present invention relates to an inorganic compound with a lamellar structure, to its process of preparation and to its use in the reinforcement of macromolecular materials. It relates more specifically to a compound based on zirconium and/or titanium phosphate. The process for the preparation of the compound comprises a stage of treatment at a pH of between 3 and 9.

25 Claims, 2 Drawing Sheets

MINERAL COMPOUNDS, METHOD FOR PREPARING SAME AND USE THEREOF IN THERMOPLASTICS MATERIALS

The present invention relates to an inorganic compound with a lamellar structure, to its process of preparation and to its use in the reinforcement of macromolecular materials. It relates more specifically to a compound based on zirconium and/or titanium phosphate.

The use is known of inorganic particles to modify the thermomechanical properties of macromolecular materials. It is thus possible to modify, for example, the modulus of the materials, the impact strength, the ductility, the dimensional stability, the heat deflection temperature, the resistance to abrasion or the abrasiveness.

It is known to reinforce macromolecular materials and in particular thermoplastics with platelet particles of nanometre thickness. Such particles can be obtained, for example, by exfoliation from an inorganic compound with a lamellar structure. This is the case, for example, for the particles obtained from montmorillonite. For this, montmorillonite, which exhibits a lamellar structure, is treated with an organic expanding agent which inserts itself between the lamellae and moves them away from one another, in order to promote their exfoliation. The organic agent often comprises an ammonium group and at least one relatively long chain. The preferred ammoniums are quaternary ammoniums.

Japanese Patent Application JP05306370 discloses the use of platelet particles obtained by exfoliation from a compound based on zirconium phosphate with a lamellar structure. The compound with a lamellar structure is treated with an organic expanding agent before incorporation in polyamide, in order to provide for its exfoliation.

The exfoliation of these inorganic compounds with a lamellar structure is important for the improvement of the thermomechanical properties of the macromolecular materials into which they are introduced. This exfoliation is promoted in particular by the preliminary treatment of the inorganic compounds with often bulky organic expanding agents, as indicated in the state of the art described above.

The preliminary treatment of the inorganic compound with these organic expanding agents can sometimes exhibit disadvantages. First, this involves an additional stage in the process for the manufacture of the final material, between the synthesis or the extraction of the compound with a lamellar structure and its use, for example as reinforcement. Secondly, the presence of the organic expanding agent can result in difficulties during the incorporation of the compound or during processes for forming the materials. The organic expanding agent may be decomposed during these operations and thus may either damage the quality of the macromolecular compound in which it is used or may lose its potential to help in the exfoliation. Finally, the compounds used are generally malodorous, which makes it unpleasant to handle them or requires large capital expenditures if freedom from the smell is to be obtained. This is particularly the case for agents comprising an ammonium group.

It is an object of the present invention to provide novel lamellar compounds based on zirconium and/or titanium phosphate exhibiting good exfoliation properties and a process for the preparation of this compound comprising a treatment not exhibiting the abovementioned disadvantages. Another object of the invention is to provide novel macromolecular-based materials comprising these lamellar compounds.

To this end, the invention first provides a compound based on zirconium and/or titanium phosphate comprising a compound according to the following formula (I):

in which

A and B are identical or different functional groups capable of reacting with the acid functional groups of the zirconium and/or titanium phosphate, R is a substituted or unsubstituted aliphatic, cycloaliphatic or aromatic hydrocarbonaceous radical comprising from 2 to 20 carbon atoms which can comprise heteroatoms, characterized in that the molar ratio $\alpha$ of the number of moles of A and B functional groups to the number of moles of the zirconium and/or titanium phosphate is between 0.1 and 0.8.

It secondly provides a process for the preparation of the above compound, optionally dispersed in a liquid, comprising the following successive stages:
a) Precipitation in acidic medium of a compound based on zirconium and/or titanium phosphate, starting from phosphoric acid and from a zirconium compound and/or from a titanium-based compound or from mixed compounds based on titanium and on zirconium, the titanium and/or the zirconium being in the IV oxidation state,
b) Crystallization of the compound,
c) Treatment of the crystallized compound, in liquid medium, at a pH of between 3 and 9.

It thirdly provides compositions comprising a macromolecular material, preferably a thermoplastic polymer, and the lamellar compound, at least partially dispersed in the form of leaves in the composition.

It fourthly provides a process for the manufacture of compositions comprising a thermoplastic matrix and a lamellar compound, and the compositions obtained according to this process, the lamellar compound being at least partially dispersed in the form of leaves in the composition.

It fifthly provides articles formed from the compositions, for example by moulding or by spinning.

Finally, it provides for the use of particles based on zirconium phosphate as modifier of the resistance to abrasion of yarns, fibres or filaments.

The compound of formula (I), present in the compound based on zirconium and/or titanium phosphate of the first object of the invention, comprises two A and B functional groups capable of reacting with the acid functional groups of the zirconium and/or titanium phosphate.

The A and B functional groups can be, for example, basic functional groups capable of reacting with the protons of the zirconium and/or titanium phosphate. The A and B functional groups are preferably provided in a neutral or positively charged form. Mention may be made, as examples of A and B functional groups which may be suitable for the invention, of amines, ammoniums or phosphoniums.

According to a preferred form of the first subject-matter of the invention, the A and B functional groups are amine functional groups. Preferably, the compound (I) is chosen from hexamethylenediamine, 2-methylpentamethylenediamine or meta-xylenediamine.

According to the first subject-matter of the invention, the molar ratio $\alpha$ of the number of moles of A and B functional groups to the number of moles of the zirconium and/or titanium phosphate is between 0.1 and 0.8.

The term "number of moles of A and B functional groups" is understood to mean the sum of the number of moles of A functional groups and of the number of moles of B functional groups. For example, one mole of compound of formula (I) corresponds to two moles of A and B functional groups.

The term "number of moles of the zirconium and/or titanium phosphate" is understood to mean the number of moles of elemental phosphorus. For example, one mole of zirconium phosphate compound generally corresponds to two moles of elemental phosphorus.

Preferably, the molar ratio α is between 0.4 and 0.6. Advantageously, the molar ratio α is substantially equal to 0.5.

According to a specific characteristic of the first subject-matter of the invention, the compound based on zirconium and/or titanium phosphate exhibits an Interleaf distance of less than or equal to 15 Å.

Generally, the R radical is not reactive with respect to the acid functional groups of the zirconium and/or titanium phosphate nor with respect to the phosphate in general.

The second subject-matter of the invention relates to a process for the preparation of the above compound. The preparation process according to the invention comprises at least the three successive stages a), b) and c). It can comprise other process stages or phases, before, after or between these stages. They are, for example, phases of washing, of purification, of filtration, of dilution, of centrifuging or of addition of compounds in order to adjust certain process parameters, such as the pH or the ionic strength. The implementation of such process phases will become apparent in particular in the light of the examples which are presented below.

Stage a) consists of a precipitation of a compound based on zirconium and/or titanium phosphate. The preparation of such precipitates is known to a person skilled in the art. It is carried out starting from phosphoric acid and from a zirconium compound and/or from a titanium compound, the zirconium and/or the titanium being in the IV oxidation state. Mention is made of zirconium and/or titanium tetrahalides or zirconium and/or titanium oxyhalides, in particular zirconium oxychloride and titanium oxychloride. Use may also be made of mixed zirconium- and titanium-based compounds.

A simplified balance of the precipitation reaction is, for example, as follows:

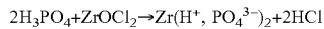

$$2H_3PO_4 + ZrOCl_2 \rightarrow Zr(H^+, PO_4^{3-})_2 + 2HCl$$

The precipitation is preferably carried out in aqueous medium. The use of phosphoric acid results in the precipitation medium being acidic. The precipitation can advantageously be carried out at acidic pH, preferably controlled acidic pH, for example of between 0.5 and 2. For this purpose, an acid may be used to complement the precursors of the precipitate. Mention is made, by way of example, of hydrochloric acid.

The precipitate may crystallize as a lamellar structure at ambient temperature without it being necessary to carry out a crystallization operation distinct from the precipitation stage.

However, it may be advantageous to carry out a distinct crystallization stage. Such a stage makes it possible to obtain, for the precipitated compound, a more marked and/or more uniform lamellar structure. The crystallization can be carried out by heat treatment in water or in an aqueous solution, for example by immersion of the compound in water at a temperature of between 100° C. and 200° C. The crystallization is preferably carried out in an acidic aqueous solution, for example a phosphoric acid solution. The duration of crystallization can be several hours.

The crystallization stage is advantageously preceded by a phase of washing the precipitate, making it possible, inter alia, to remove the ionic entities resulting from the precipitation reaction.

The crystallization stage is advantageously followed by a washing and centrifuging phase. According to a preferred characteristic, the pH measured in the aqueous phase of a dispersion comprising the crystallized compound, with a solids content of 20% by weight, is between 0.5 and 2.

According to a preferred characteristic of the process, all the stages of the process are thus carried out at acidic pH between 0.5 and 2. According to another preferred characteristic, the lamellar compound is never dried, the only operations for the removal of water being filtration or centrifuging operations. The term "drying operation" is understood here to mean an operation during which the compound is introduced into a hot atmosphere devoid of water for a period of time of greater than 15 minutes, for example into an oven.

The compound crystallizes in the α phase of zirconium phosphate. The structure of this phase has been described, for example, in J. Inorg. Nucl. Chem., vol. 26, p. 117–129. This phase exhibits a lamellar structure, with protons intercalated between the lamellae. Without wishing to be committed to any one theory, it is believed that these protons can be exchanged by a positively charged chemical entity.

The treatment stage c) consists in treating the crystallized compound in liquid medium at a pH of between 3 and 9.

The liquid medium is preferably an aqueous solution, in which the compound based on zirconium phosphate is dispersed. The aqueous solution comprises an inorganic or organic compound of such a nature and/or in such an amount that the pH is between 3 and 9. According to a preferred characteristic, the pH is between 4 and 7.

The inorganic or organic compound is chosen from compounds which, in aqueous solution, exhibit a pH of greater than 3, preferably greater than 7.

The compound is generally the compound of formula (I) described above, corresponding to the compound based on zirconium and/or titanium phosphate which it is desired to prepare. The use of these organic compounds may be very particularly indicated for the use of the compound with a lamellar structure for the reinforcement of polyamides.

According to a preferred embodiment of the second subject-matter of the invention, the organic compound is hexamethylenediamine.

By way of example, the inorganic compound for the treatment at a pH of between 2 and 7 can also be chosen from alkali metal or alkaline earth metal hydroxides, for example sodium hydroxide; inorganic compounds of the ammonium ion, such as ammonium hydroxide; or lithium, sodium or potassium cations, optionally in the presence of a basic agent. The organic compound can, for example, be caprolactam or ammonia. These compounds may be indicated for the use of the compound with a lamellar structure for the reinforcement of polyamides.

After the treatment stage, the compound can be washed and/or separated from the liquid medium, for example by filtration or evaporation of the liquid medium, preferably evaporation of water. It can also be dried.

There is thus obtained an inorganic compound with a lamellar structure which can easily exfoliate into platelet particles. The compound can be conditioned in various forms. It can be conditioned in the powder form, after removal of the liquid medium and optionally drying. It can be conditioned in the form of a dispersion in a liquid medium, for example water.

The form of the conditioning generally depends on the use for which it is intended. Thus, for the use for the reinforcement of synthetic polymers, the compound can advantageously be introduced in the form of a dispersion into the medium for the synthesis of the polymer. Preferably, the compound is introduced in the form of a dispersion into the medium comprising the monomers which are the source of the synthetic polymer.

The third subject-matter of the invention relates to compositions comprising a matrix composed of a macromolecular material and a lamellar compound based on zirconium and/or titanium phosphate at least partially dispersed in the form of leaves in the matrix. The lamellar compound is the compound described above.

The macromolecular material can be of different natures: elastomeric, thermoplastic or thermosetting.

The macromolecular material is preferably a thermoplastic polymer. Mention is made, as examples of polymers which may be suitable, of: polylactones, such as poly(pivalolactone), poly(caprolactone) and polymers of the same family; polyurethanes obtained by reaction between diisocyanates, such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and compounds of the same family, and diols with long linear chains, such as poly(tetramethylene adipate), poly(ethylene adipate), poly(1,4-butylene adipate), poly(ethylene succinate), poly(2,3-butylene succinate), polyether diols and compounds of the same family; polycarbonates, such as poly[methanebis(4-phenyl)-carbonate], poly[1,1-etherbis(4-phenyl)carbonate], poly[diphenylmethanebis(4-phenyl)carbonate], poly[1,1-cyclohexanebis(4-phenyl)carbonate] and polymers of the same family; polysulphones; polyethers; polyketones; polyamides, such as poly(4-aminobutyric acid), poly(hexamethylene adipamide), poly(6-aminohexanoic acid), poly(m-xylylene adipamide), poly(p-xylylene sebacamide), poly(2,2,2-trimethylhexamethylene terephthalamide), poly(meta-phenylene isophthalamide), poly(p-phenylene terephthalamide) and polymers of the same family; polyesters, such as poly(ethylene azelate), poly(ethylene 1,5-naphthalate), poly(1,4-cyclohexanedimethylene terephthalate), poly(ethylene oxybenzoate), poly([lacuna] para-hydroxybenzoate), poly(1,4-cyclohexylidenedimethylene terephthalate), polyethylene terephthalate, polybutylene terephthalate and polymers of the same family; poly(arylene oxides), such as poly(2,6-dimethyl-1,4-phenylene oxide), poly(2,6-diphenyl-1,4-phenylene oxide) and polymers of the same family; poly(arylene sulphides), such as poly(phenylene sulphide) and polymers of the same family; polyetherimides; vinyl polymers and their copolymers, such as polyvinyl acetate, polyvinyl alcohol, polyvinyl chloride, polyvinylbutyral, polyvinylidene chloride, ethylene-vinyl acetate copolymers and polymers of the same family; acrylic polymers, polyacrylates and their copolymers, such as polyethyl acrylate, poly(n-butyl acrylate), polymethyl methacrylate, polyethyl methacrylate, poly(n-butyl methacrylate), poly(n-propyl methacrylate), polyacrylamide, polyacrylonitrile, poly(acrylic acid), ethylene-acrylic acid copolymers, ethylene-vinyl alcohol copolymers, acrylonitrile copolymers, methyl methacrylate-styrene copolymers, ethylene-ethyl acrylate copolymers, methacrylate-butadiene-styrene copolymers, ABS and polymers of the same family; polyolefins, such as low density poly(ethylene), poly(propylene), low density chlorinated poly(ethylene), poly(4-methyl-1-pentene), poly(ethylene), poly(styrene) and polymers of the same family; ionomers; poly(epichlorohydrins); poly(urethane)s, such as polymerization products of diols, such as glycerol, trimethylolpropane, 1,2,6-hexanetriol, sorbitol, pentaerythritol, polyetherpolyols, polyesterpolyols and compounds of the same family, with polyisocyanates, such as 2,4-tolylene diisocyanate, 2,6-tolylene diisocyanate, 4,4'-di-phenylmethane diisocyanate, 1,6-hexamethylene diisocyanate, 4,4'-dicyclohexylmethane diisocyanate and compounds of the same family; polysulphones, such as the products of reaction between a sodium salt of 2,2-bis(4-hydroxyphenyl)propane and 4,4'-dichloro-diphenyl sulphone; furan resins, such as poly(furan); cellulose ester plastics, such as cellulose acetate, cellulose acetate butyrate, cellulose propionate and polymers of the same family; silicones, such as poly(dimethylsiloxane), poly(dimethylsiloxane-co-phenylmethylsiloxane) and polymers of the same family; or blends of at least two of the above polymers.

Preference is very particularly given, among these thermoplastic polymers, to polyamides, such as polyamide-6, polyamide-6,6, semiaromatic polyamides, PVC, PET, PPO and the blends and copolymers based on these polymers.

The compositions can also comprise other additives, such as, for example, stabilizers, plasticizers, flame-retardants, dyes, lubricants or catalysts. This list does not have any limiting nature. They can additionally comprise other reinforcing additives, such as modifiers of the impact strength, such as optionally grafted elastomers, inorganic reinforcements, such as clays or kaolin, or fibrous reinforcements, such as glass fibres, aramide fibres or carbon fibres.

Any method which makes it possible to obtain a dispersion of compounds in a macromolecular material can be used to prepare the composition. A first process consists in blending the lamellar compound in a thermoplastic material in the melt form and in optionally subjecting the blend to high shearing, for example in a twin-screw extrusion device, in order to achieve good dispersion. Another process consists in mixing the compound to be dispersed with the monomers in the polymerization medium and then in carrying out the polymerization. Another process consists in blending, with a thermoplastic polymer in the melt form, a concentrated blend of a thermoplastic polymer and of dispersed particles, which blend is prepared, for example, according to one of the processes described above.

There is no restriction on the form under which the lamellar compound is introduced into the medium for the synthesis of the macromolecular compound or into a molten thermoplastic polymer. It can, for example, be introduced in the form of a solid powder or in the form of a dispersion in water or in an organic dispersant.

In the context of polyamide-based compositions, an advantageous embodiment consists in introducing, into the polymerization medium, a dispersion in water of the lamellar compound based on zirconium phosphate. In particular, the dispersion can be introduced into the medium comprising the monomers of the polyamide to be manufactured. The polymerization processes carried out in the context of this embodiment are conventional processes.

The proportion by weight of the lamellar compound in the composition is preferably less than or equal to 5%.

The fourth subject-matter of the invention relates to a process for the manufacture of a composition comprising a thermoplastic matrix and a compound based on zirconium and/or titanium phosphate, according to which process a compound based on zirconium and/or titanium phosphate exhibiting an interleaf distance of less than or equal to 15 Å is introduced into the matrix or into the medium for the polymerization of the matrix.

Everything described above relating to the method for the introduction of compounds into a macromolecular material for the third subject-matter of the invention is valid here in an identical way for the fourth subject-matter of the invention.

The compound based on zirconium and/or titanium phosphate, introduced into the matrix according to the fourth subject-matter of the invention, preferably exhibits an interleaf distance of less than or equal to 13 Å.

This compound based on zirconium and/or titanium phosphate comprises an inorganic or organic compound comprising at least one functional group capable of reacting with the acid functional groups of the zirconium and/or titanium phosphate.

For example, such an inorganic or organic compound can be in the form of a cation. Mention may be made, as inorganic compound in the cationic form, by way of example, of metal cations, alkali metal cations, such as $Na^+$, $K^+$ or $Li^+$, or the ammonium ion $NH_4^+$. Without wishing to be committed to any one theory, it is believed that such cations can be exchanged with the protons of the zirconium and/or titanium phosphate.

A cation, such as $Na^+$, $K^+$, $Li^+$, or $NH_4^+$, corresponds to a functional group capable of reacting with the acid functional groups of the zirconium and/or titanium phosphate.

The inorganic compound is preferably the $Na^+$ ion.

According to a specific embodiment of the fourth subject-matter of the invention, the inorganic or organic compound comprises a functional group capable of reacting with the acid functional groups of the zirconium and/or titanium phosphate.

The functional group can be a basic functional group. Mention may be made, as basic functional group, of, for example, the amine functional group. The functional group can, for example, be in a neutral or positively charged form.

According to a preferred form, the organic compound is a monoamine. It can, for example, be an aliphatic monoamine, such as n-butylamine. According to another advantageous form, the organic compound is an amino acid or a lactam. Mention may be made, for example, of caprolactam.

According to another specific embodiment of the fourth subject-matter of the invention, the inorganic or organic compound comprises two functional groups capable of reacting with the acid functional groups of the zirconium and/or titanium phosphate.

In particular, the organic compound is a compound according to the following formula (II):

A-R—B    (II)

in which

A and B are identical or different functional groups capable of reacting with the acid functional groups of the zirconium and/or titanium phosphate, R is a substituted or unsubstituted aliphatic, cycloaliphatic or aromatic hydrocarbonaceous radical comprising from 2 to 20 carbon atoms which can comprise heteroatoms.

Everything described above relating to the compound of formula (I), in particular the nature of the A and B functional groups and of the R radical, for the first subject-matter of the invention is valid here in an identical way for the fourth subject-matter of the invention.

According to a preferred form of the fourth subject-matter of the invention, the molar ratio β of the number of moles of functional groups capable of reacting of the inorganic or organic compound to the number of moles of the zirconium and/or titanium phosphate is between 0.1 and 0.8.

The term "number of moles of functional groups capable of reacting" is understood to mean the sum of the number of moles of each functional group of the inorganic or organic compound capable of reacting. For example, for a compound comprising a single functional group capable of reacting, the number of moles of functional groups capable of reacting corresponds to the number of moles of the compound. For a compound comprising two functional groups capable of reacting, the number of moles of functional groups capable of reacting corresponds to twice the number of moles of the compound.

The term "number of moles of the zirconium and/or titanium phosphate" is understood to mean the number of moles of elemental phosphorus. For example, one mole of zirconium phosphate compound generally corresponds to two moles of elemental phosphorus.

Preferably, the molar ratio β is between 0.4 and 0.6. Advantageously, the molar ratio β is substantially equal to 0.5.

According to a specific alternative form of the fourth subject-matter of the invention, the compound based on zirconium and/or titanium phosphate exhibiting an interleaf distance of less than or equal to 15 Å is obtained by the preparation process of the second subject-matter of the invention. The inorganic or organic compound of the treatment stage c) is appropriately chosen according to the compound based on zirconium and/or titanium phosphate which it is desired to prepare.

The invention also relates to the compositions obtained by the manufacturing process of the fourth subject-matter of the invention, at least a portion of the compound based on zirconium and/or titanium phosphate being dispersed in the form of leaves in the composition.

Everything described above relating to the compositions of the third subject-matter of the invention is valid here in an identical way for the compositions obtained by the process of the fourth subject-matter of the invention, in particular that relating to the nature of the matrix, to the proportion of the compound based on zirconium and/or titanium phosphate in the composition and to the addition of other additives.

The invention also relates, in a fifth subject-matter, to the articles formed from the compositions of the invention described above in the third subject-matter and the fourth subject-matter of the invention. The articles can be formed by moulding or spinning.

The processes for the manufacture of moulded articles which can be used are, for example, injection moulding, extrusion or extrusion-blow moulding processes.

The invention also relates to yarns, fibres or filaments composed of a composition of the invention.

The spun articles, yarns, fibres or filaments are prepared according to conventional spinning techniques starting from a material comprising a thermoplastic polymer and the compound based on zirconium and/or titanium phosphate. The spinning can be carried out immediately after the polymerization of the thermoplastic polymer, the latter being in the melt form. It can be carried out starting from a granular composite comprising the compound and the polymer. The compound can be incorporated in the molten polymer before the spinning operation, in the form of a concentrated blend in a polymer. Any method for the incorporation of a compound in a polymer to be spun can be used.

The yarns, fibres or filaments according to the invention can be subjected to any treatment which can be carried out in stages subsequent to the spinning stage. They can in particular be drawn, textured, crimped, heated, twisted, dyed, sized, cut, and the like. These additional operations can be carried out continuously and can be incorporated after the spinning device or can be carried out batchwise. The list of the operations subsequent to the spinning is in no way limiting.

The yarns, fibres or filaments according to the invention can be used in the woven, knitted or nonwoven form. The fibres according to the invention are suitable in particular for the manufacture of paper machine felts. They can also be used for the manufacture of yarns for fitted carpets.

The use of platelet particles based on zirconium phosphates makes it possible to improve the resistance to abrasion of a material. This improvement is particularly advantageous in the context of the use of the material in the form of yarns, fibres or filaments.

Other details or advantages of the invention will become more clearly apparent in the light of the examples below, given solely by way of indication.

EXAMPLE 1

Preparation of a Crystallized Compound Based on Zirconium Phosphate

The following reactants are used:
Hydrochloric acid (Prolabo, 36%, d=1.19)
Phosphoric acid (Prolabo, 85%, d=1.695)
Deionized water
Zirconium oxychloride (in the powder form) comprising 32.8% of $ZrO_2$.

Stage a): Precipitation

An aqueous zirconium oxychloride solution comprising 2.1 mol/l of $ZrO_2$ is prepared beforehand.

The following solutions:

| | |
|---|---|
| Hydrochloric acid | 50 ml |
| Phosphoric acid | 50 ml |
| Deionized water | 150 ml | are added at ambient temperature to a 1 liter stirred reactor. After stirring the mixture, 140 ml of the 2.1M aqueous zirconium oxychloride solution are added continuously with a flow rate of 5.7 ml/min.

Stirring is maintained for 1 hour after the end of the addition of the zirconium oxychloride solution.

After removing the aqueous mother liquors, the precipitate is washed by centrifuging at 4 500 rev/min with 1 200 ml of 20 g/l $H_3PO_4$ and then with deionized water until a conductivity of 6.5 mS (supernatant) is achieved. A cake of the precipitate based on zirconium phosphate is obtained.

Stage b): Crystallization

The cake is dispersed in 1 liter of 10M aqueous phosphoric acid solution and the dispersion thus obtained is transferred into a 2 liter reactor and then heated to 115° C. This temperature is maintained for 5 hour.

The dispersion obtained is washed by centrifuging with deionized water to a conductivity of less than 1 mS (supernatant). The cake resulting from the final centrifuging is redispersed, so as to obtain a solids content in the region of 20%; the pH of the dispersion is between 1 and 2.

A dispersion of a crystallized compound based on zirconium phosphate is obtained, the characteristics of which dispersion are as follows:

size and morphology of the particles: analysis with a Transmission Electron Microscope (TEM) demonstrates that a lamellar structure has been obtained, the lamellae of which structure exhibit a hexagonal shape with a size of between 200 and 500 nm. The particles are composed of a stack of substantially parallel platelets, the thickness of the stacks along the direction perpendicular to the platelets being approximately 200 nm.

XRD analysis demonstrates that the crystallized phase $Zr(HPO_4)_2 \cdot 1H_2O$ has been obtained Solids content: 18.9% (by weight)

pH: 1.8

Conductivity: 8 mS

EXAMPLES 2–3

Treatment of the Compound with an Inorganic Base (Stage c))

805 g (on a dry basis) of product resulting from Example 1 are centrifuged. The centrifuging pellet is redispersed in a $10^{-3}$ mol/l aqueous sodium hydroxide solution (500 ml). Three washing operations are carried out according to these same conditions. The cake resulting from the last centrifuging is redispersed in 500 ml of $10^{-3}$ mol/l sodium hydroxide solution. The pH is adjusted to 5 (Example 2) or to 3 (Example 3) by addition of 8 mol/l sodium hydroxide. The dispersion is centrifuged and the pellet is redispersed in 300 ml of purified water (solids content: 30% by weight). The final conductivity of the suspension is less than 1 mS.

EXAMPLE 4

Treatment of the Compound with an Organic Base (Stage c))

The product resulting from Example 1 is neutralized by addition of hexamethylenediamine: a 70% aqueous HMD solution is added to the dispersion until a pH of 5 is obtained. The dispersion thus obtained is homogenized using an Ultra-Turrax. The final solids content is adjusted by addition of deionized water (solids content: 15% by weight).

EXAMPLE 5

Treatment of the Compound with Caprolactam (Stage c))

Caprolactam is incorporated in the inorganic sol obtained according to Example 1 (33% by weight of caprolactam with respect to the solids content). The pH measured in the solution is 3.3. Subsequently, by distillation of the water, a powder is recovered which comprises the corresponding caprolactam fraction.

EXAMPLES 6–10

Compositions Comprising Platelet Particles Based on Zirconium Phosphate

A polyamide-6 is synthesized from caprolactam according to a conventional process while introducing, into the polymerization medium, an aqueous dispersion obtained in Examples 2 to 4 or the powder obtained in Example 5. The proportion of compound based on zirconium phosphate introduced is 2% by weight. A polymer not comprising the compound is also synthesized

Comparative Example 10

After polymerization, the polymer is formed into granules. The latter are washed to remove the residual caprolactam (the granules are immersed in an excess of water at 90° C. for a few hours) and are then dried under low vacuum (<0.5 mbar) for 16 hours at 110° C.

Tensile tests are carried out on extruded rods conditioned at 50% RH and 23° C. for 30 days. The diameter of the rods is between 0.5 and 1 mm. An Instron 1185 tensile-testing device with a force meter with a capacity of 100 N is used. The nominal stress (ratio of the force measured to the cross section, evaluated by measuring the diameter with a Palmer) is recorded as a function of the relative deformation applied. The results are recorded in Table 1.

TABLE 1

| Example | Compound introduced | Modulus at the start (MPa) | Relative elongation at break (%) |
|---|---|---|---|
| 6 | Example 2 | 1610 | 350 |
| 7 | Example 3 | 1350 | 340 |
| 8 | Example 4 | 1420 | 360 |
| 9 | Example 5 | 1290 | 260 |
| 10 | / | 920 | 320 |

A polyamide-based composition is obtained for which the elongation at break is greater than that of a polyamide not comprising the inorganic compound and for which the modulus is improved.

Compositions obtained as above comprising PA-6 and 5% by weight of compound based on zirconium phosphate are observed with a TEM with respect to sections with a mean thickness of 0.1 μm. The presence of a great many dispersed inorganic lamellae of nanometre thickness and with a width of 50 to 100 nm is observed.

Figure 1:
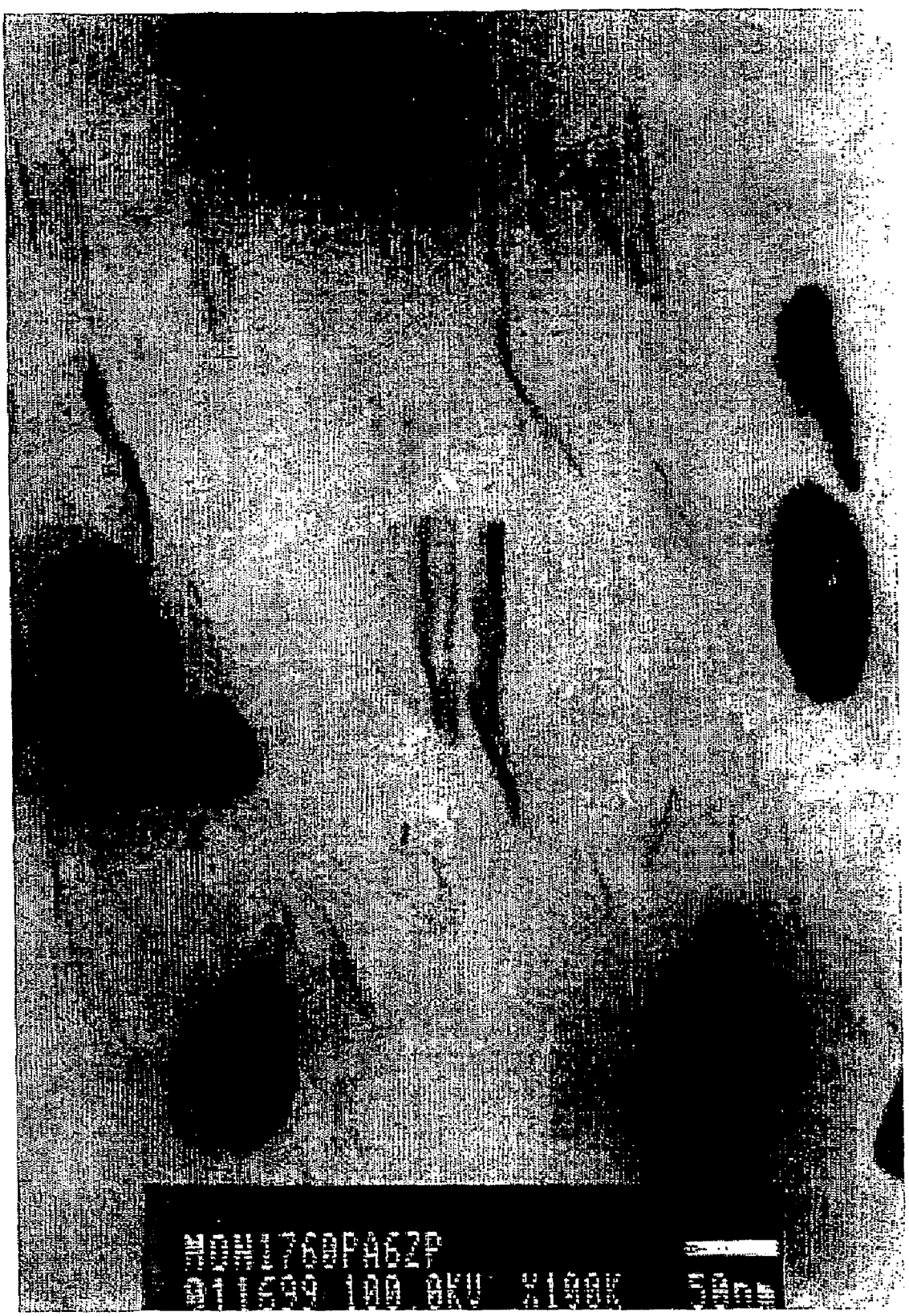
FIG. 1 represents a photograph of a composition observed with a microscope comprising the zirconium phosphate compound corresponding to Example 2.
Figure 2:
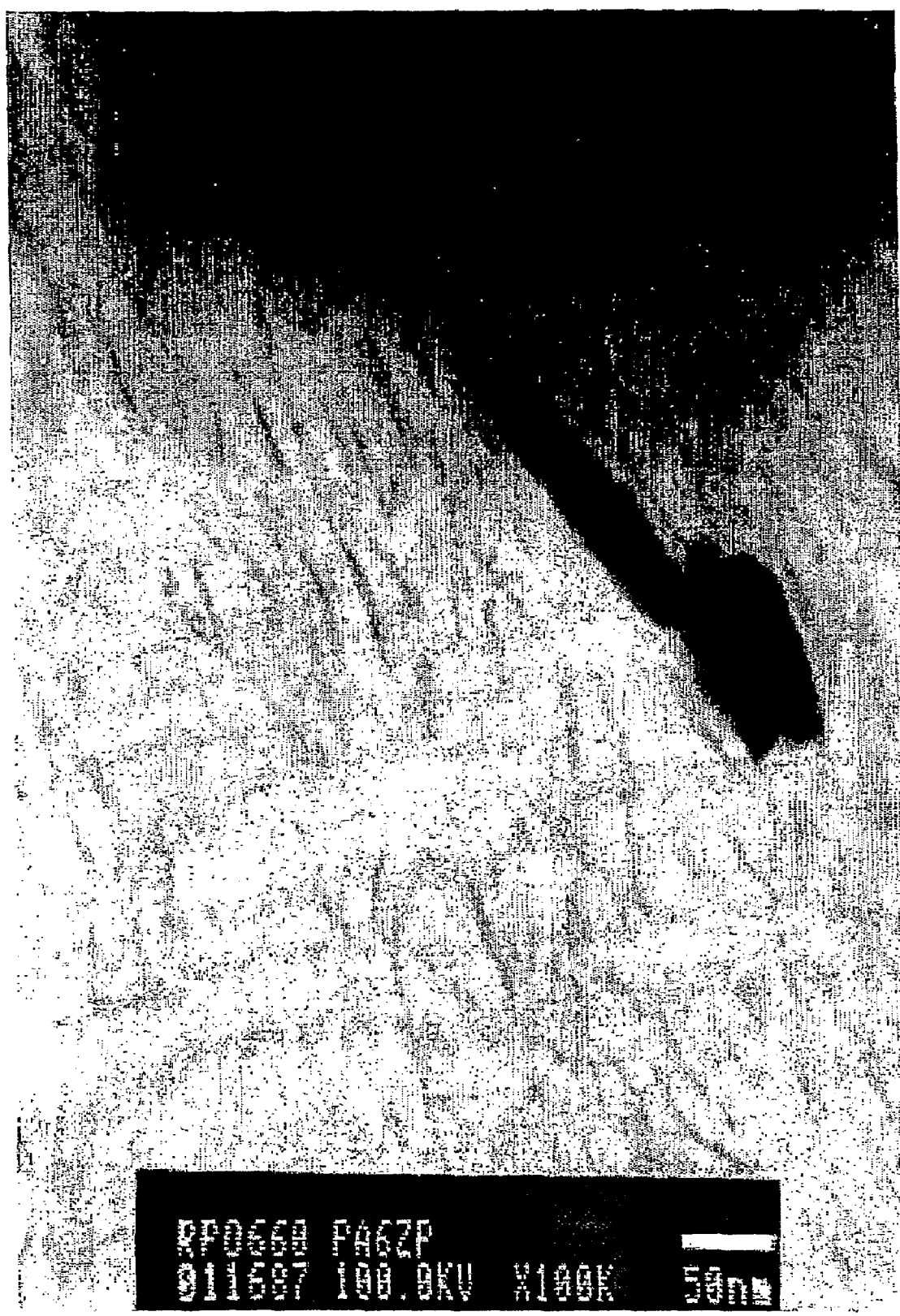
FIG. 2 represents a photograph of a composition observed with a microscope comprising the zirconium phosphate compound corresponding to Example 4.

The presence of a great many dispersed inorganic lamellae of nanometre thickness and with a width of 50 to 100 nm is observed.

EXAMPLES 11–14

Filaments

Monofilaments with a diameter of approximately 250 μm are spun at low speed from a composition according to Example 9 or from a pure polyamide according to Example 10. The monofilaments are subsequently drawn at different draw ratios. The mechanical properties and the resistance to abrasion of the monofilaments are evaluated according to the following tests:

Mechanical characterization (elongation at break, tensile strength): carried out on an Erichsen tensile-testing device placed in a controlled-environment chamber at 50% RH and 23° C. after conditioning the yarns for 72 hours under these conditions. The initial length of the yarns is 50 mm and the crosshead speed is 50 mm/min.

Resistance to abrasion: simultaneous rubbing is applied to 15 immobile yarns, the tension of which is kept constant over 15 yarns, by 3 brass rollers which provide a tensioning rail. The point of application of the tensioning-rail region is displaced along the yarns over an amplitude of 90 mm at a frequency of 220 cycles per minute. The resistance to abrasion is defined by the number of cycles (to-and-fro) necessary to break 13 of the 15 yarns. The measurements presented are the means of the values obtained over three tests with similar yarns.

The characteristics of the yarns produced are presented in Table 2. The properties measured are presented in Table 3.

TABLE 2

| Example | Material | Draw ratio | Diameter (μm) |
|---|---|---|---|
| 11 | Example 9 | 4.66 | 115 |
| 12 | Example 9 | 3.93 | 126 |

TABLE 3

| Example | Resistance to abrasion (cycles) | Tensile strength (MPa) | Elongation at break (%) | 2% Modulus (MPa) | 5% Modulus (MPa) |
|---|---|---|---|---|---|
| 11 | 6225 | 564 | 19.7 | 3760 | 3770 |
| 12 | 10860 | 427 | 30.8 | 3000 | 2960 |

EXAMPLES 15–17

Compositions Comprising Platelet Particles Based on Zirconium Phosphate

A polyamide-6 is synthesized from caprolactam according to a conventional process while introducing, into the polymerization medium, an aqueous dispersion obtained in Example 4. The proportion of compound based on zirconium phosphate introduced is 1 (Example 16) or 2 (Example 17) % by weight. A polymer not comprising the compound is also synthesized (Comparative Example 15).

After polymerization, the polymer is formed into granules. The latter are washed to remove the residual caprolactam (the granules are immersed in an excess of water at 90° C. for a few hours) and are then dried under low vacuum (<0.5 mbar) for 16 hours at 110° C.

Evaluations

Various tests were carried out on the compositions:

Tensile strength according to the ISO 527 standard, measured after conditioning the test specimen at 23° C. and at a relative humidity of 50%.

Tensile modulus according to the ISO 527 standard, measured after conditioning the test specimen at 23° C. and at a relative humidity of 50%.

Flexural modulus according to the ISO 178 standard, measured after conditioning the test specimen at 23° C. and at a relative humidity of 50%.

Heat deflection temperature (HDT) according to the ISO 75 standard, under a load of 1.81 N/mm².

The various compositions and the evaluations are presented in Table 4 below.

TABLE 4

|  | Examples | | |
| --- | --- | --- | --- |
|  | 15 (Comparative) | 16 | 17 |
| Proportion by weight of zirconium phosphate compound (%) | 0 | 1 | 2 |
| Tensile strength (N/mm²) | 48 | 93 | 101 |
| Tensile modulus (N/mm²) | 3000 | 3500 | 3900 |
| Flexural modulus (N/mm²) | 2900 | 3450 | 3800 |
| HDT 1.81 N/mm² (° C.) | 52 | 65 | 76 |

Polyamide-based compositions are obtained for which the tensile strength, the modulus and the heat deflection temperature are greater than those of a polyamide not comprising the inorganic compound.

The invention claimed is:

1. A process for the manufacture of a composition comprising a thermoplastic matrix and a zirconium phosphate, wherein the zirconium phosphate exhibits an interleaf distance of less than or equal to 15 Å and is introduced into the matrix or into the medium for the polymerization of the matrix, and
the zirconium phosphate has the formula of $Zr(HPO_4)_2$.

2. The process according to claim 1, wherein the zirconium phosphate is prepared by the following successive stages:
a) precipitation in an acidic medium of a zirconium phosphate, starting from phosphoric acid and from a zirconium compound, the zirconium being in the IV oxidation state,
b) crystallization of the phosphate, and
c) treatment of the crystallized compound, in liquid medium, at a pH of between 3 and 9 by immersing the crystallized compound in a liquid comprising an inorganic or organic compound which, in aqueous solution, exhibits a pH of greater than 3, said organic or inorganic compound being chosen from the alkali metal or alkaline earth metal hydroxides; the inorganic compounds of the ammonium ion and of lithium, sodium or potassium cations; caprolactam and ammonia.

3. The process according to claim 2, which further comprises a washing phase d) after stage c).

4. The process according to claim 3, which further comprises a drying stage e) after stage d).

5. The process according to claim 2, wherein stage a) is carried out in an aqueous medium at a pH of less than 2 and in that the zirconium compound is zirconium oxychloride.

6. The process according to claim 2, wherein the crystallization stage is carried out in phosphoric acid.

7. The process according to claim 1, comprising dispersing the zirconium phosphate in the matrix in the form of leaves.

8. The process according to claim 1, further comprising introducing an aqueous solution comprising the zirconium phosphate into a medium for the polymerization of the matrix.

9. The process according to claim 1, wherein the interleaf distance of the zirconium phosphate is less than or equal to 13Å.

10. The process according to claim 1, wherein the zirconium phosphate comprises an inorganic or organic compound comprising at least one functional group capable of reacting with acid functional groups of the zirconium phosphate.

11. The process according to claim 10, wherein the inorganic or organic compound is in the cationic form.

12. The process according to claim 11, wherein the inorganic compound is the Na⁺ ion.

13. The process according to claim 10, wherein the inorganic or organic compound comprises a functional group capable of reacting with the acid functional groups of the zirconium phosphate.

14. The process according to claim 13, wherein the functional group capable of reacting is an amine functional group.

15. The process according to claim 14, wherein the organic compound is a monoamine.

16. The process according to claim 14, wherein the organic compound is an amino acid or a lactam.

17. The process according to claim 10, wherein the organic compound is a compound according to the following formula (II):

A-R—B          (II)

in which
A and B are identical or different functional groups capable of reacting with the acid functional groups of the zirconium phosphate,
R is a substituted or unsubstituted aliphatic, cycloaliphatic or aromatic hydrocarbonaceous radical comprising from 2 to 20 carbon atoms which can comprise heteroatoms.

18. The process according to claim 17, wherein the A and B functional groups are amines.

19. The process according to claim 18, wherein the compound (II) is selected from the group consisting of hexamethylenediamine, 2-methylpentamethylenediamine and meta-xylenediamine.

20. The process according to claim 10, wherein the molar ratio β of the number of moles of functional groups capable of reacting of the inorganic or organic compound to the number of moles of the zirconium phosphate is between 0.1 and 0.8.

21. The process according to claim 20, wherein the ratio β is between 0.4 and 0.6.

22. The process according to claim 21, wherein the ratio β is substantially equal to 0.5.

23. The process according to claim 1, wherein an aqueous solution of the zirconium phosphate is introduced into the medium for the polymerization of the matrix.

24. The process according to claim 1, wherein the proportion by weight of zirconium phosphate in the composition is less than or equal to 5%.

25. A method to modify the resistance to abrasion of yarns, fibres or filaments comprising forming a composition according to the process of claim 1, and forming the yarns, fibres or filaments from the composition.

* * * * *